(12) United States Patent
Pflaum et al.

(10) Patent No.: US 7,530,588 B2
(45) Date of Patent: May 12, 2009

(54) MOUNTING ASSEMBLY FOR A VIBRATION DAMPER

(75) Inventors: Thomas Pflaum, Bamberg (DE); Claudius Freisinger, Stuttgart (DE); Andreas Zietsch, Üchtelhausen-Zell (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 491 days.

(21) Appl. No.: 11/491,710

(22) Filed: Jul. 24, 2006

(65) Prior Publication Data

US 2007/0023983 A1    Feb. 1, 2007

(30) Foreign Application Priority Data

Jul. 25, 2005    (DE) ............... 10 2005 035 256

(51) Int. Cl.
- *B60G 13/00* (2006.01)
- *F16F 7/00* (2006.01)
- *F16F 9/00* (2006.01)

(52) U.S. Cl. .......... 280/124.155; 267/195; 267/220; 280/124.145; 280/124.147

(58) Field of Classification Search .......... 267/195, 267/217, 219, 220; 280/124.145, 124.147, 280/124.154, 124.155
See application file for complete search history.

(56) References Cited

U.S. PATENT DOCUMENTS 5,009,401 A * 4/1991 Weitzenhof ............... 267/64.21
5,772,380 A 6/1998 Cloud et al.
6,260,835 B1 * 7/2001 Angles et al. ............... 267/220
6,572,089 B2 6/2003 Zietsch
2002/0047231 A1 4/2002 Zietsch
2006/0054436 A1 * 3/2006 Handke et al. ......... 188/321.11

FOREIGN PATENT DOCUMENTS

| DE | 37 16 099 | 1/1988 |
| DE | 100 51 769 | 11/2001 |
| DE | 10 2004 039 734 | 2/2006 |
| EP | 1 375 317 | 1/2004 |
| JP | 59143779 | 2/1983 |

OTHER PUBLICATIONS

European Search Report dated Nov. 14, 2006 issued in a corresponding foreign application.

* cited by examiner

*Primary Examiner*—John Q. Nguyen
*Assistant Examiner*—James English
(74) *Attorney, Agent, or Firm*—Cohen Pontani Lieberman & Pavane LLP

(57) ABSTRACT

Mounting assembly for a vibration damper, comprising at least one aligning surface on the vibration damper side, which is in working connection with an opposing surface on the vehicle side at least during the installation of the vibration damper in a receiving opening in the vehicle. The at least one aligning surface and the opposing surface rotationally align the mounting side with the vehicle side. The aligning surface is arranged on a mounting cap with torque-transmitting element, and with at least one axial support surface for cooperation with the opposing surface on the vehicle side. The mounting cap prevents the vibration damper from falling out of the mounting assembly through the use of a carrier on the mounting side, to which the vibration damper is attached, this carrier having a retaining element in the form of a tongue which engages an opening in the mounting cap.

9 Claims, 5 Drawing Sheets

Prior Art

MOUNTING ASSEMBLY FOR A VIBRATION DAMPER

BACKGROUND OF THE INVENTION

The invention relates to a mounting assembly for a vibration damper.

U.S. Pat. No. 6,572,089, which represents the state of the art, describes a mounting assembly for a vibration damper, comprising at least one surface, which is in working connection with an opposing surface on the vehicle side at least during the installation of the vibration damper in a receiving opening in the vehicle, where the at least one surface and the opposing surface rotationally align connecting means on the mounting side with connecting means on the vehicle side. The at least one surface of the mounting assembly is arranged on a mounting cap, which is in working, torque-transmitting connection with the overall mounting assembly.

The great advantage of a mounting cap of this type is that, during the assembly process, the vibration damper can be introduced into the installation location more-or-less imprecisely with respect to its alignment in the circumferential direction. The mounting cap takes care of the exact positioning. The advantage of the cap becomes even more obvious when repairs are made in the garage. No assembly robot is available in that situation for precisely installing the vibration damper. Instead, the mechanic would have to find the correct position by eye.

If enough space is available in the vehicle, the installation aid can also be used as a cap for the piston rod.

When the vibration damper is introduced into the wheelhouse by the installer or by means of a device, the fastening screws between the mounting assembly and the vehicle body must be installed immediately. During installation in a new vehicle, the problem occurs that the vibration damper must be introduced from the underside of the vehicle, whereas an installer must install the fastening means, usually threaded nuts, from above. These installation sequences make it difficult to design an efficient assembly line.

In the case of manual installation during a repair process, it is necessary under certain conditions for one mechanic to introduce the vibration damper into the wheelhouse and to hold it there, while a second mechanic installs the fastening means.

SUMMARY OF THE INVENTION

An object of the present invention is to realize a mounting assembly for a vibration damper which minimizes the problems associated with the installation process known from the state of the art.

The object is achieved according to the invention in that the mounting cap prevents the vibration damper from falling out of the mounting assembly through the use of a carrier on the mounting side, to which the vibration damper is attached, this carrier being provided with a retaining means in the form of at least one tongue, which engages in an opening in the mounting cap.

The advantage of the invention consists in that the mounting cap fulfills two support functions; that is, it supports the vibration damper on the carrier and supports the carrier on the vehicle body. For the course of the installation process, what results is the decisive advantage that, after the installer has introduced the complete module consisting of the mounting assembly and the vibration damper through the wheelhouse and into the body and the mounting assembly has aligned itself automatically in the circumferential direction so that the fastening means between the mounting assembly and the body are aligned, the mounting cap then holds the entire assembly in the installation position. After that, the same installer can secure the fastening means by reaching through the open hood or trunk lid.

It is also advantageous for the at least one tongue to be present in the space defined by the mounting cap. Use is thus made of the space which is available in any case as a result of the conical shape of the mounting cap. There is no need to provide any axial space.

The mounting cap should be kept as light in weight and therefore as thin-walled as possible. For this reason, the at least one opening is designed independently of the torque-transmitting connection between the mounting cap and the carrier. If the opening, together with the tongue, is designed to absorb torsional forces, then the wall thickness would have to be significantly increased, and in turn the usable space inside the mounting cap would decrease to the same extent.

The mounting cap has at least one inside wall, in which the opening for the tongue is provided. The inside wall is subjected only to tensile force by the tongue.

The tongue is designed as an L-shaped web of the carrier. This shape easily creates an axial offset between the top of the carrier and the free end of the tongue. The size of the axial offset determines the axial depth to which the tongue penetrates into the space defined by the mounting cap.

The inside wall is provided with a certain radial elasticity, so that the tongue of the carrier does not have to execute any radial movement during installation. To promote easy installation, the bottom end of the at least one inside wall has a feed bevel facing the tongue. On contact with the tongue, this bevel causes the inside wall to deflect in the radial direction, which allows the tongue to slide more easily into the opening.

The mounting cap has two major axes of different lengths, the at least one inside wall being essentially parallel to the shorter of the two major axes. This makes it possible for two inside walls to be a relatively large distance apart. A wide base is thus made available for aligning the mounting assembly with respect to the vehicle body, which ensures optimal results.

The at least one axial support surface is essentially parallel to the longer of the two major axes. Assuming a constant wall thickness, the area parallel to the longer of the two major axes is thus easier in principle to make elastic. In addition, more space is available for notches, which will allow the support surfaces of the mounting cap to execute a certain amount of elastic movement in the radial direction during the installation of the mounting cap in the body.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is to be explained in greater detail below on the basis of the following description of the figures.

DETAILED DESCRIPTION OF THE PREFERRED EMBODIMENTS

Figure 1:
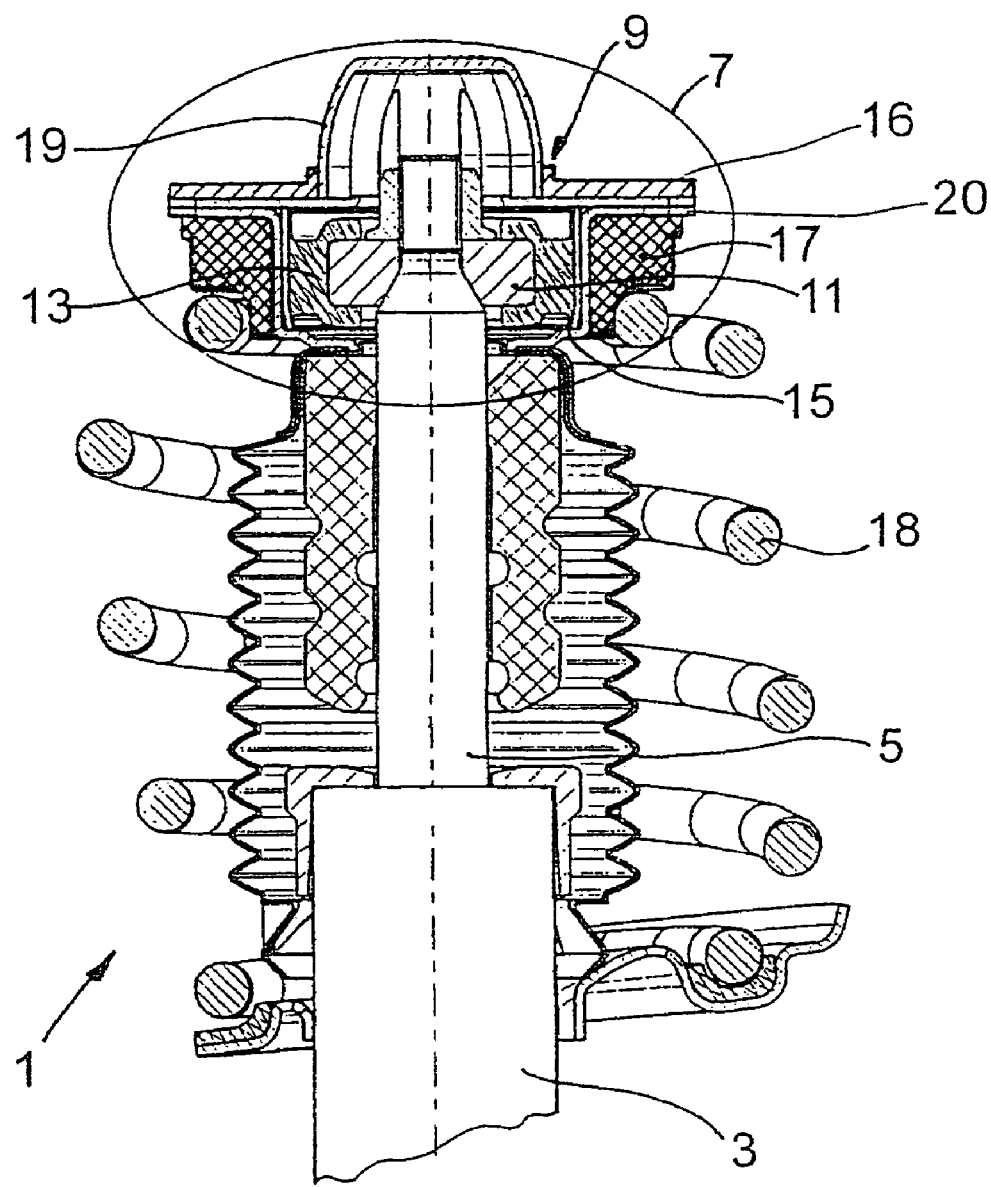
FIG. 1 is a longitudinal cross-sectional view of a vibration damper with a mounting assembly in the installed state.
Figure 2:
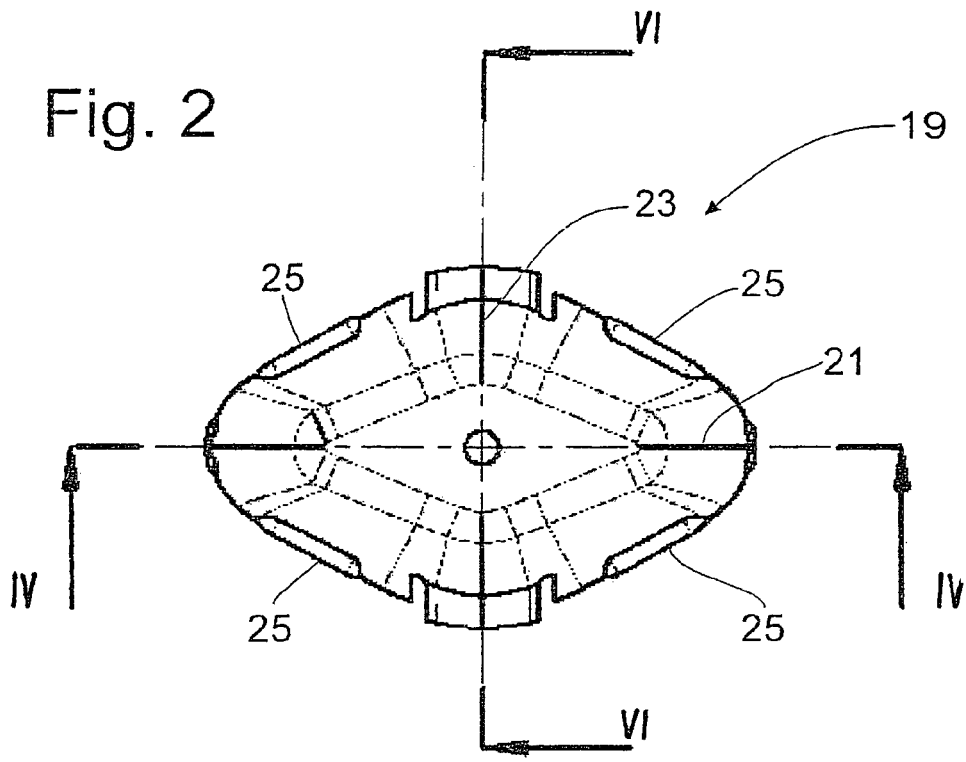
FIG. 2 is a top view of a mounting cap of the mounting assembly of FIG. 1.

FIG. 1 shows the installation situation at the upper end of a vibration damper 1, which comprises a cylinder 3, in which a piston rod 5 is supported with freedom of axial movement. At its outer end, the piston rod has a mounting assembly 7 for attachment to a vehicle, of which only a receiving opening 9 in a carrier is shown. A receiving opening of this type can be, for example, provided in an inside fender of the vehicle.

The mounting assembly 7 comprises a support body 11, which is at least partially enclosed by a spring element 13. The spring element in turn is enclosed by a two-part mounting housing 15 consisting of a carrier 16 and a mounting cup 20, on the outside surface of which a spring base 17 for a vehicle suspension spring 18 is supported. The entire mounting assembly is covered by a mounting cap 19.

FIGS. 2-7 show the mounting cap according to FIG. 1 as an isolated part. In the top view of FIG. 2, it can be seen that the mounting cap 19 has an elliptical cross section with two major axes 21, 23 of different lengths. The receiving opening 9 in the vehicle has a similar cross section. On the outside, aligning surfaces 25, which are essentially parallel to the long major axis 21, are provided, which cooperate with opposing surfaces at the edges of the receiving opening on the vehicle side to orient the mounting cap in the circumferential direction.

Figure 3:
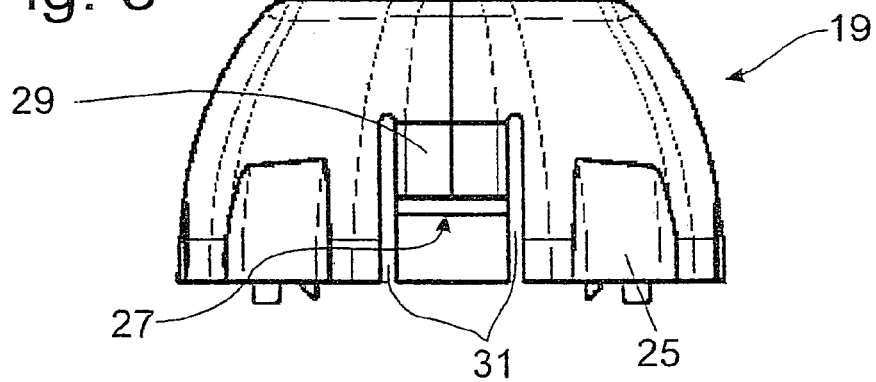
FIG. 3 is a side view of the mounting cap of FIG. 2.
Figure 5:
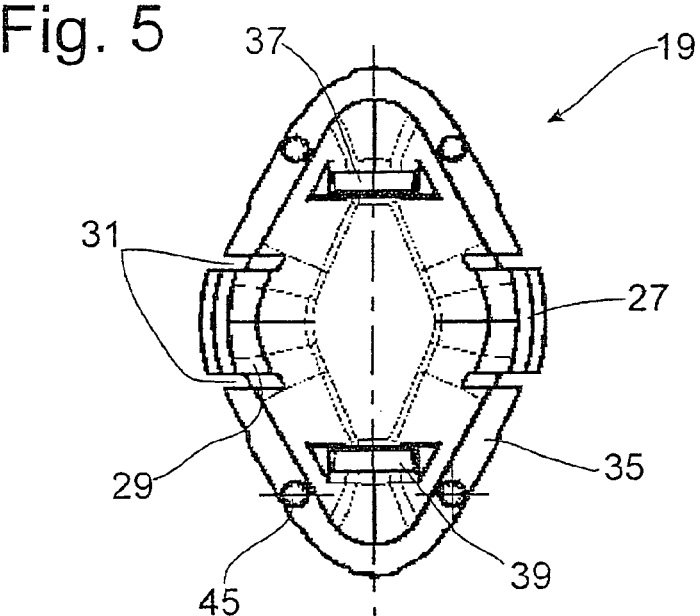
FIG. 5 is a bottom view of the mounting cap of FIG. 2.
Figure 6:
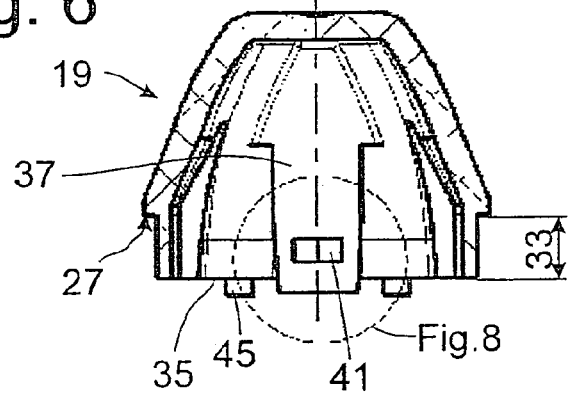
FIG. 6 is a sectional view of the mounting cap of FIG. 2 along the line VI-VI.
Figure 7:
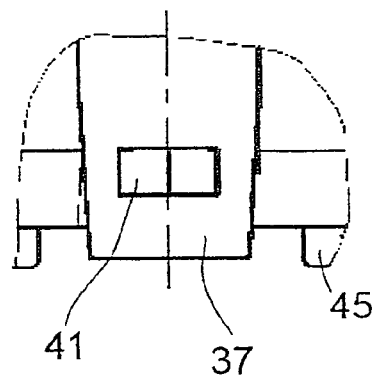
FIG. 7 is an enlarged view of section VII in FIG. 6.

Examination of FIGS. 3, 5, and 6 shows that opposing support surfaces 27 are located more-or-less centrally with respect to the long major axis; these surfaces come to rest on the top surface of the edge of the receiving opening 9 and thus hold the mounting cap axially in place with respect to the vehicle body. The support surfaces are provided at their ends with radially elastic sections 29, which are separated by notches 31 from the other wall parts of the mounting cap. The distance 33 between the support surfaces 27 and the base surface 35 is at least equal to the wall thickness of the edge of the receiving opening 9.

Figure 4:
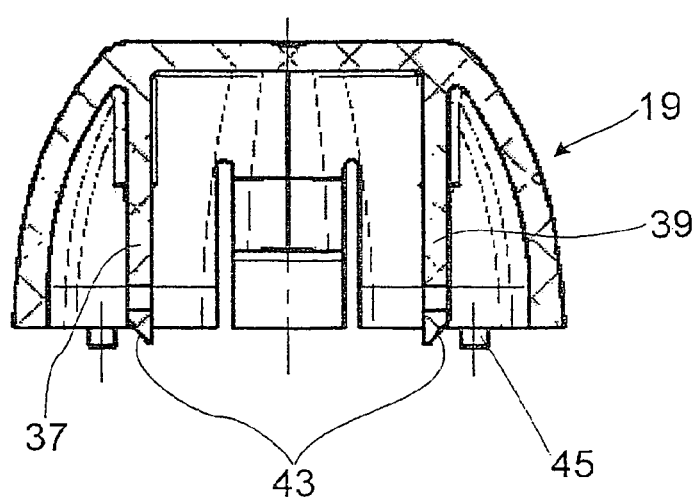
FIG. 4 is a sectional view of the mounting cap of FIG. 2 along lines IV-IV.

FIG. 4, which shows a longitudinal cross section through the mounting cap 19; FIG. 5, which shows a view from underneath; and FIG. 6, which shows another cross section, illustrate that, in the interior space defined by the mounting cap, inside walls 37, 39 are essentially parallel to the short major axis 23. Each of these inside walls has a window-like opening 41. The inside walls can be elastically deformed within certain limits toward the short major axis. The bottom ends of the inside walls are provided with feed bevels 43.

Pin-like projections 45, furthermore, which serve as a torque-transmitting connection after the cap has been installed, extend from the base surface 35.

Figure 8:
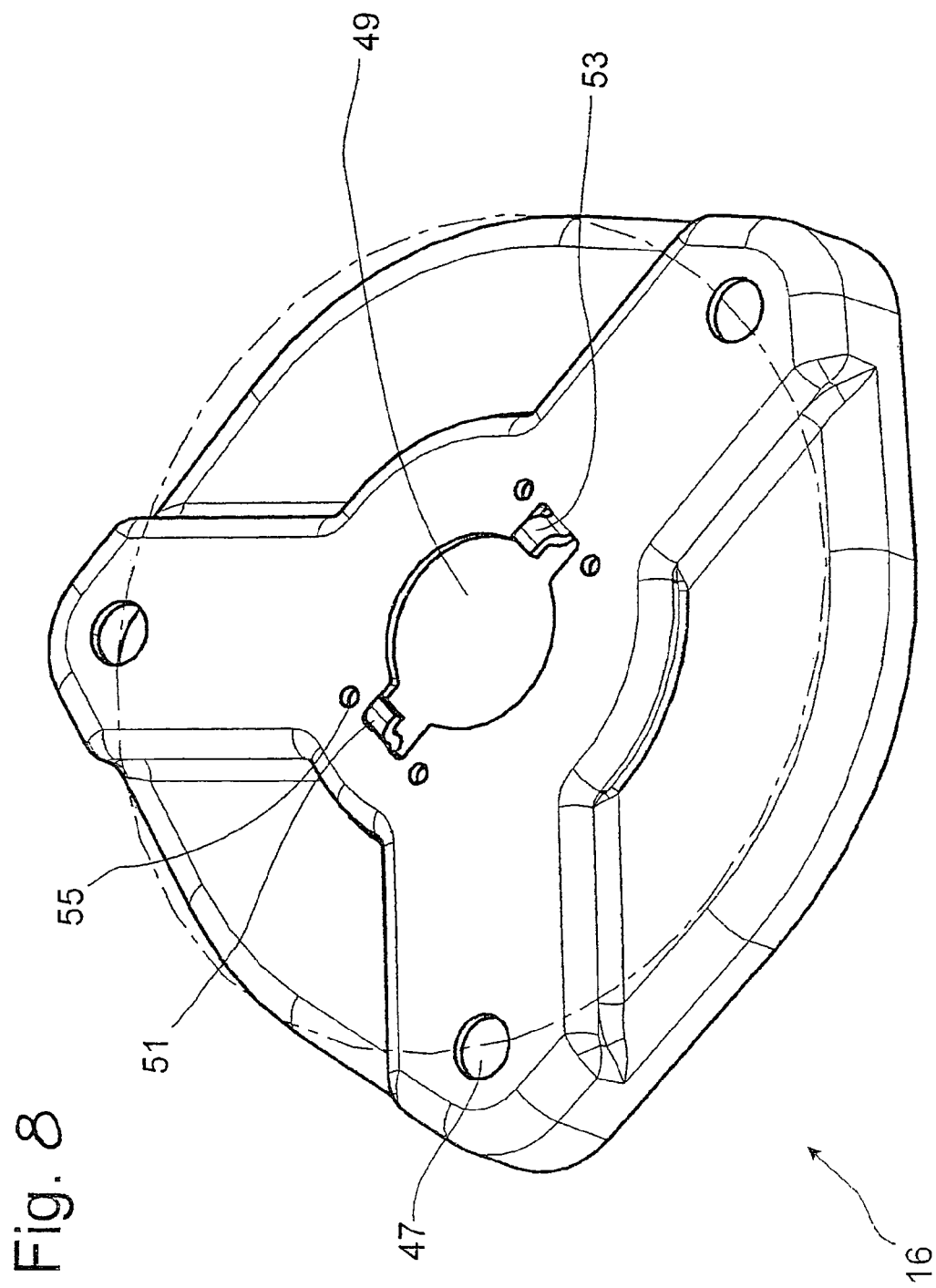
FIG. 8 shows the carrier of the mounting assembly in isolation.
Figure 9:
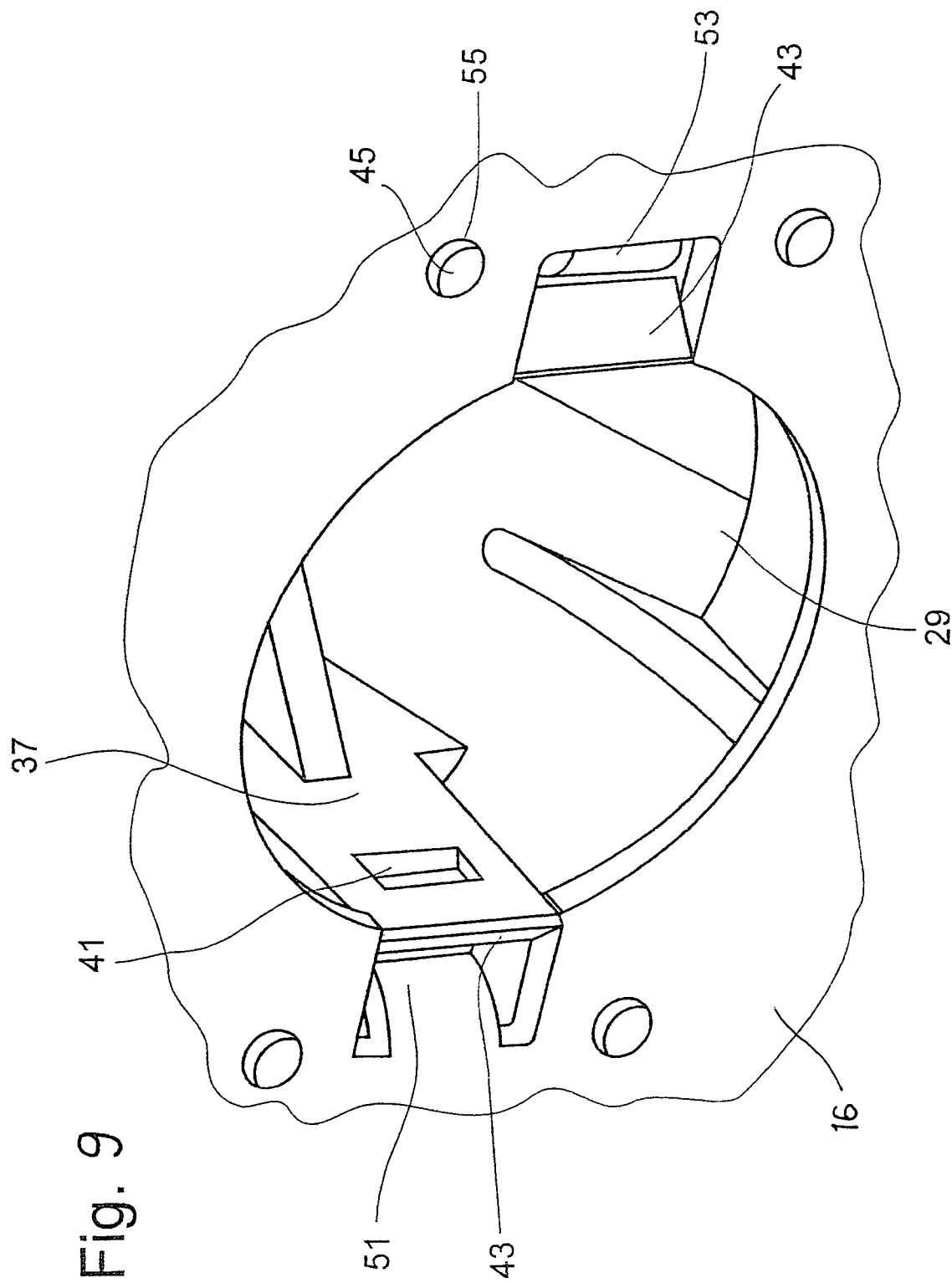
FIG. 9 shows the mounting cap mounted on the carrier.

FIG. 8 shows the carrier 16 according to FIG. 1 as an isolated part. On an outer pitch circle, through-openings 47 for fastening means (not shown) for making the attachment to the vehicle body are provided. A circular cutout 49 offers space for the upper end of the piston rod 5. Two opposing tongues 51, 53 with an L-shaped cross section are cut out from the plane of the carrier. Laterally from the tongues are four openings 55, the distances between which are identical to the spacing between the projections 45 of the mounting cap.

During installation, the vibration damper according to FIG. 1, with the carrier 16 at the top, is fitted with a mounting cap 19. As this happens, the feed bevels 43 slide along the tops of the tongues 51, 53, and the inside walls 37, 39 are thus pushed toward the short major axis 23. The tongues 51, 53 are present in the space defined by the mounting cap and can thus latch in the openings 41 in the inside walls, so that a positive connection is established between the carrier 16 and the mounting cap 19, as shown in FIG. 11. The pin-like projections 45 on the mounting cap, furthermore, engage in the openings 55 in the carrier 16. For this reason, the connection between the tongues 51, 53 and the openings 41 does not transmit any torsional forces between the mounting cap and the carrier.

The overall unit is now introduced into the receiving opening 9 in the vehicle body, where the aligning surfaces 25 on the outside surface of the mounting cap 19 take care of aligning the through-openings 47 with the corresponding fastening means of the vehicle body. The radially elastic sections 29 are deformed radially inward and move back into their relaxed starting positions after the mounting cap has arrived in its predetermined position. The support surfaces 27 of the sections 29 now rest axially on the edge of the receiving opening. In this phase of the installation process, the mounting cap 19 is automatically retained in the receiving opening in the axial direction, and, as a result of the positive connection between the tongues 51, 53 and the openings 41, it supports the vibration damper via the carrier 16 even before the fastening means between the carrier and the vehicle body have been installed.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A mounting assembly for mounting a vibration damper to a mounting surface in a vehicle, the mounting surface having a receiving opening and connecting means for connecting to said mounting assembly, wherein said mounting assembly comprises:

a carrier element with a retainer having at least one tongue, the carrier element being fixedly connectable to the vibration damper; and a mounting cap comprising at least one surface connectable with a corresponding surface in the receiving opening in the vehicle for rotationally aligning the connecting means on the mounting surface of the vehicle with corresponding connecting means on mounting assembly, said mounting cap having a torque transmitting element for transmitting torque to the vibration damper when the vibration damper is connected to said carrier element and at least one axial support surface cooperating with the opposing mounting surface on the vehicle when the mounting cap is received in the receiving opening, said mounting cap having an opening arranged and dimensioned for receiving the at least one tongue of the carrier element so that the vibration damper is prevented from falling out of said mounting assembly when the vibration damper is connected to said carrier element.

2. The mounting assembly of claim 1, wherein said mounting cap defines an interior space, said at least one tongue being arranged in said interior space when the at least one tongue is received in said opening of said mounting cap.

3. The mounting assembly of claim 1, wherein said opening for receiving the at least one tongue is separate from said torque transmitting element.

4. The mounting assembly of claim 1, wherein said at least one tongue is formed by an L-shaped web on said carrier.

5. The mounting assembly of claim 1, wherein said mounting cap defines an interior space and further comprises an inner wall within said interior space, said inner wall comprising said at least one opening.

6. The mounting assembly of claim 5, wherein the mounting cap has a center axis along a longitudinal length of the installed location of the vibration damper, and wherein a free end of said inner wall is radially elastic relative to a center axis of said mounting cap.

7. The mounting assembly of claim 5, wherein a bottom end of said inner wall has a bevel facing said at least one tongue.

8. The mounting assembly of claim 5, wherein said mounting cap has two major lateral axes of different lengths, the inner wall being parallel to a shorter one of said two major lateral axes.

9. The mounting assembly of claim 8, wherein said at least one axial support surface is substantially parallel to a longer one of said two major lateral axes.

* * * * *